United States Patent
Perkins et al.

(10) Patent No.: US 6,694,205 B2
(45) Date of Patent: Feb. 17, 2004

(54) BINARY REGISTRATION MARK DETECTION USING 3-STATE SENSING AND MATCHED FILTERING

(75) Inventors: Mark D. Perkins, Appleton, WI (US); Kenneth H. Suess, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 48 days.

(21) Appl. No.: 10/036,967

(22) Filed: Dec. 21, 2001

(65) Prior Publication Data

US 2003/0116617 A1 Jun. 26, 2003

(51) Int. Cl.[7] .............................................. G06F 19/00
(52) U.S. Cl. .................. 700/115; 250/559.44; 347/116; 438/401
(58) Field of Search .......................... 700/115; 347/116; 399/301; 250/559.44; 382/165; 356/401; 438/401

(56) References Cited

U.S. PATENT DOCUMENTS

| | | |
|---|---|---|
| 3,249,940 A | 5/1966 | Erickson |
| 3,875,415 A * | 4/1975 | Woodward ............... 250/491.1 |
| 3,987,278 A | 10/1976 | Van Elzakker et al. |
| 4,095,225 A | 6/1978 | Erikmats |
| 4,327,292 A | 4/1982 | Wang et al. |
| 4,371,264 A | 2/1983 | Lacombat et al. |
| 4,402,610 A | 9/1983 | Lacombat |
| 4,431,923 A | 2/1984 | Wang et al. |
| 4,688,088 A | 8/1987 | Hamazaki et al. |
| 4,837,715 A | 6/1989 | Ungpiyakul et al. |
| 4,884,075 A | 11/1989 | Mangelsdorf |
| 4,921,278 A | 5/1990 | Shiang et al. |
| 5,018,212 A | 5/1991 | Manns et al. |
| 5,046,110 A | 9/1991 | Carucci et al. |
| 5,073,954 A | 12/1991 | Van Tyne et al. |
| 5,235,515 A | 8/1993 | Ungpiyakul et al. |
| 5,239,177 A | 8/1993 | Cunniff |
| 5,388,517 A | 2/1995 | Levien |
| 5,402,726 A | 4/1995 | Levien |
| 5,424,747 A | 6/1995 | Chazelas et al. |
| 5,552,611 A | 9/1996 | Enichen |
| 5,563,955 A | 10/1996 | Bass et al. |

(List continued on next page.)

FOREIGN PATENT DOCUMENTS

| | | |
|---|---|---|
| DE | 19853416 A1 | 6/1999 |
| EP | 0545701 A1 | 6/1993 |
| EP | 0545737 A1 | 6/1993 |
| EP | 0645770 A2 | 3/1995 |
| EP | 0729148 A2 | 8/1996 |
| EP | 0927649 A1 | 7/1999 |
| JP | 60-222855 A2 | 11/1985 |
| JP | 05-291104 A2 | 11/1993 |

*Primary Examiner*—Albert W. Paladini
(74) *Attorney, Agent, or Firm*—Senniger, Powers, Leavitt & Roedel

(57) ABSTRACT

A system and method for detecting a registration mark representing a binary code sequence of N bits. A sensor is provided to output values indicating whether positive bits, negative bits, or no bits of the binary code sequence are detected. A sequence of N sensor values are provided to a code matching filter for comparison with the binary code sequence. The code matching filter increases a value of a detection signal for each sensor value which matches its corresponding bit, decreases the detection signal value for each sensor value which is complementary to its corresponding bit, and neither increases nor decreases the detection signal value in response to a sensor value indicating detection of no bit of the binary code sequence. When the binary code sequence is a Barker code, the code matching filter yields the ideal Barker auto-correlation function response whenever the binary code sequence is detected.

20 Claims, 7 Drawing Sheets

U.S. PATENT DOCUMENTS

| | | |
|---|---|---|
| 5,745,528 A | 4/1998 | Fimoff et al. |
| 5,760,815 A * | 6/1998 | Genovese .................... 347/116 |
| 5,765,083 A * | 6/1998 | Shinohara ................... 347/116 |
| 5,766,389 A | 6/1998 | Brandon et al. |
| 5,818,719 A | 10/1998 | Brandon et al. |
| 5,828,075 A * | 10/1998 | Siler et al. ............. 250/559.44 |
| 5,889,269 A | 3/1999 | Bridgelall et al. |
| 6,043,864 A | 3/2000 | Lo et al. |
| 6,064,486 A | 5/2000 | Chen et al. |
| 6,112,658 A | 9/2000 | Gunther et al. |
| 6,298,150 B1 * | 10/2001 | Sonoda et al. .............. 382/165 |

* cited by examiner

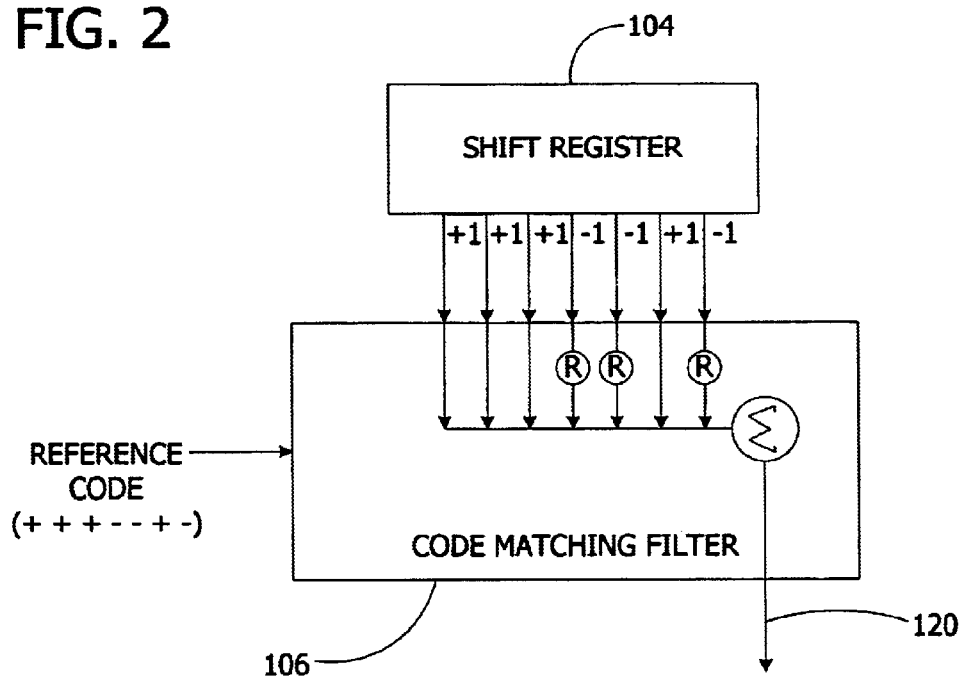

BINARY REGISTRATION MARK DETECTION USING 3-STATE SENSING AND MATCHED FILTERING

FIELD OF THE INVENTION

The present invention relates to detecting a registration mark associated with an object, and more particularly to detecting a registration mark representing a binary code sequence using three-state sensing and matched filtering.

BACKGROUND OF THE INVENTION

A vast number of applications exist in which it is necessary or desirable to monitor certain parameters related to an object. One common example is the need to monitor the position, velocity, acceleration, etc. of one or more components in a manufacturing process. For instance, in a largely automated process for manufacturing disposable diapers, certain components (e.g., absorbent pads, waist elastic bands, printed graphics, etc.) must be positioned or aligned with respect to other components (e.g., support layers, etc.) in order to produce an acceptable product. To facilitate this process, registration marks are commonly applied to certain components. These registration marks are then detected during the manufacturing process using sensors to determine parameters of interest including, for example, when a component is present at a particular location, where to position a particular component, etc.

Frequently, a registration mark is applied to an object as a single mark which, when detected by a sensor, produces a single pulse at the sensor output. This approach, however, sometimes results in detection errors. For example, noise in the system may falsely trigger the sensor output, or may prevent detection of the registration mark. Additionally, sensors may confuse one registration mark with another similar mark. Regardless of the cause, these detection errors can all lead to errors in the registration process and component positioning during product manufacture. As a result, the quality of the manufactured product may suffer, and the product itself may have to be discarded at a corresponding cost to the manufacturer.

It is also known to use registration marks which represent a specific binary code sequence referred to as a "perfect word." Perfect words are known to exhibit autocorrelation functions with low sidelobes when used in certain radar applications. In one registration system using perfect words, a matched filter compares each bit in a detected sequence of bits with corresponding bits in a perfect word. The filter output is then incremented by one for each matching pair of compared bits. Thus, in the case of a seven bit perfect word, the filter output will have a maximum amplitude of seven upon detecting a sequence of bits which completely matches the perfect word. As best understood, however, no change is made to the filter output in response to a non-matching pair of compared bits. Therefore, if all but one pair of compared bits match, then the filter output will have an amplitude of six (assuming a seven bit perfect word is used). Thus, the difference in the filter output for matching and non-matching inputs may be as small as one, as is the case in the single pulse registration systems described above.

As recognized by the inventors hereof, what is needed is a registration system which produces a filter output having a high amplitude in response to a matching input, and an advantageously lower amplitude, as compared to the prior art, for non-matching inputs.

SUMMARY OF THE INVENTION

In order to solve these and other needs in the art, the inventors hereof have succeeded at designing a system and method for detecting a registration mark associated with an object which provides improved discrimination between matching and non-matching inputs. The registration mark preferably represents a binary code sequence of N bits, where N is an integer greater than one. A sensor is provided to sense for the registration mark, and to output a value indicating whether a positive bit, a negative bit, or no bit of the binary code sequence is detected. A sequence of N sensor values are provided to a code matching filter for comparison with the binary code sequence. The code matching filter preferably increases a value of the detection signal for each sensor value which matches its corresponding bit, decreases the value of the detection signal for each sensor value which is complementary to its corresponding bit, and neither increases nor decreases the value of the detection signal in response to a sensor value indicating detection of no bit of the binary code sequence. When the binary code sequence is a Barker code, the code matching filter yields the ideal Barker response whenever the binary code sequence is detected.

According to one aspect of the invention, a method is provided for sensing a registration mark associated with an object, with the registration mark representing a binary code sequence of N bits with each bit having either a first discrete value or a second discrete value, where N is an integer greater than one. The method includes sensing for the registration mark, and generating a sensor value in response to the sensing. The sensor value takes a first state when a bit having the first discrete value is detected, a second state when a bit having the second discrete value is detected, and a third state when no bit having the first discrete value or the second discrete value is detected.

According to another aspect of the invention, a system is provided for detecting a registration mark associated with an object, with the registration mark representing a binary code sequence of N bits with each bit having either a first discrete value or a second discrete value, where N is an integer greater than one. The system includes a sensor for sensing for the registration mark. The sensor has an output which takes a first state when a bit having the first discrete value is detected, a second state when a bit having the second discrete value is detected, and a third state when no bit having the first discrete value or the second discrete value is detected. The system also includes a shift register for sampling the sensor output over time to produce a sequence of sensor values, and a matching filter operatively connected to the shift register for comparing N of the sensor values with corresponding bits of the binary code sequence, and for generating a detection signal in response to the comparing. The matching filter is configured to increase a value of the detection signal for each sensor value which matches its corresponding bit of the binary code sequence, decrease the value of the detection signal for each sensor value which is complementary to its corresponding bit of the binary code sequence, and neither increase nor decrease the value of the detection signal for each sensor value taking the third state. The detection signal indicates detection of the registration mark when the detection signal exceeds a predefined value.

While some of the principal features and advantages of the invention have been described above, a greater and more thorough understanding of the invention may be attained by referring to the drawings and detailed description of preferred embodiments which follow.

BRIEF DESCRIPTION OF THE DRAWINGS

FIG. 2 is a block diagram illustrating one preferred implementation of the code matching filter shown in FIG. 1.

FIG. 3 is a table of known Barker codes.

Corresponding reference characters indicate corresponding features throughout the several views of the drawings.

DETAILED DESCRIPTION OF PREFERRED EMBODIMENTS

Figure 1:
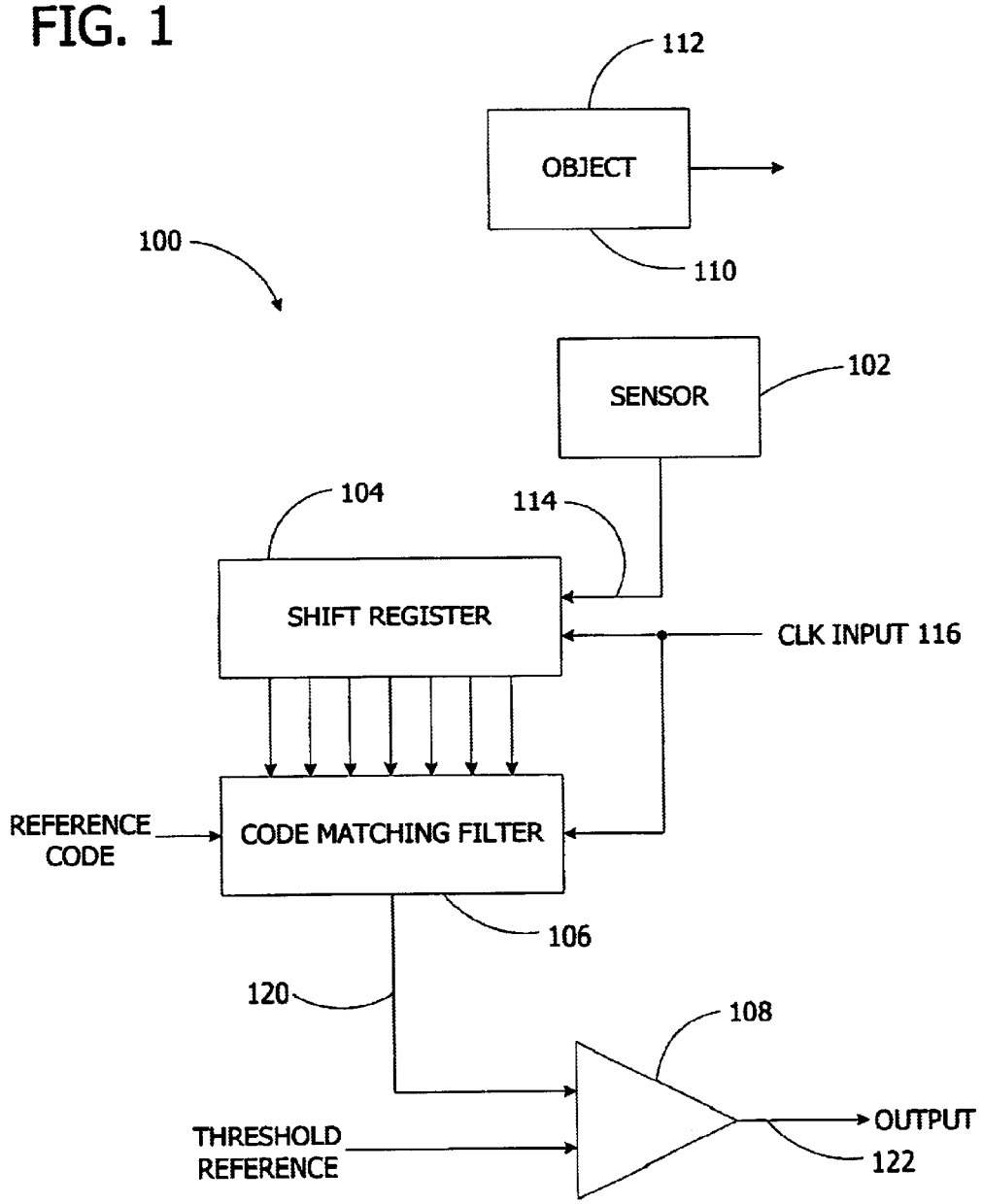
FIG. 1 is a block diagram of a system according to one preferred embodiment of the invention for detecting a registration mark associated with an object using matched filtering.

A system for detecting a registration mark associated with an object using matched filtering according to one embodiment of the present invention is illustrated in FIG. 1 and indicated generally by reference character 100. As shown in FIG. 1, the system 100 includes a sensor 102, a shift register 104, a code matching filter 106, and a comparator 108. With the exception of the sensing functionality of the sensor 102, the aforementioned components of the system 100 may be implemented in hardware or software, or a combination of both, as will be apparent.

The sensor 102 is provided for detecting a registration mark 110 applied to or otherwise associated with an object 112. As further explained below, the registration mark 110 represents a binary code sequence of N bits, where N is an integer greater than 1, and where each bit has one of two discrete values (e.g., 0 or 1, +1 or −1, etc.). As the object 112 moves relative to the sensor 102, the sensor sequentially reads each bit of the registration mark 110. As each bit is read, the sensor preferably outputs a value of either +1 or −1, corresponding to the value of the detected bit. This 2-state sensor output is provided to an input 114 of the shift register 104.

The shift register 104 has a bit storage capacity corresponding to the number of bits in the binary code sequence. In the particular embodiment under discussion, the registration mark 110 represents a seven bit sequence (which may or may not be a Barker code, as further explained below), and the shift register 104 is capable of storing seven bits, as shown in FIG. 1. However, other sequence lengths may be used without departing from the scope of the invention. The shifting of bits in the shift register 104 is controlled by a clock input 116 in a conventional manner. With each clock cycle, the content of each stage is shifted to the next higher stage (i.e., one stage to the left in FIG. 1), and a new bit is loaded from the shift register's input 114 into its lowest stage (i.e., the right-most stage in FIG. 1). Thus, as a sequence of bits are sequentially read by the sensor 102, a replicated version of the detected sequence is passed through the shift register 104, preferably in the form of plus and minus ones, and transmitted in parallel to the code matching filter 106.

The code matching filter 106 is preferably also controlled by the clock input 116. During each clock cycle, the code matching filter 106 compares each bit received from the shift register 104 with a corresponding bit of a reference code provided to the code matching filter 106. In this embodiment, the reference code is the binary code sequence represented by the registration mark 110. The results of the comparisons are then used to generate a detection signal 120 for input to the comparator 108. In addition to incrementing the detection signal 120 for each matching pair of compared bits, as further explained below, the code matching filter 106 preferably decrements the detection signal 120 for each non-matching pair of compared bits. In this manner, a penalty is assessed for each non-matching pair of compared bits. This results in greater discrimination between the detection signal generated for a completely matching code sequence and the detection signal generated for any non-matching code sequence. A preferred manner for implementing this functionality will now be described with reference to FIG. 2.

As shown in FIG. 2, the code matching filter 106 sums the value of each bit received from the shift register 104, possibly after reversing the sign (i.e., polarity) of one or more such bits. The particular bits whose signs are reversed are determined according to the reference code provided to the code matching filter. For the particular embodiment illustrated in FIG. 2, the code matching filter 106 is provided with the following reference code: + + + − − + −. Therefore, the polarity of the fourth, fifth and seventh bits received from the shift register 104 are reversed (as indicated by the ®'s in FIG. 2) prior to summing. Consequently, if the bits received from the shift register during a particular clock period match perfectly with the reference code, as shown illustratively in FIG. 2, then the polarity of all received bits having a value of −1 are reversed prior to summing, resulting in a detection signal having a maximum possible amplitude of seven. This process can also be described as multiplying each bit received from the shift register 104 by a corresponding bit in the reference code, where all such bits have a value of plus or minus one, and then summing the products of the multiplications.

In the implementation described above, the output of the sensor 102 at any given time is either a +1 or a −1, depending on the value of the detected bit. Alternatively, the sensor 102 may output only non-negative values (e.g., 0 or 1), with the code matching filter 106 providing appropriate logic to penalize the detection signal 120 for each non-matching pair of compared bits (where, e.g., a sensor value of zero is deemed to match a negative bit of the binary code sequence).

By incrementing the detection signal 120 for each matching pair of compared bits, the detection signal is provided with a maximum amplitude of N whenever the detected bit sequence received from the shift register 104 matches perfectly with the reference code, where N represents the number of bits in the reference code. Moreover, by decrementing the detection signal for each non-matching pair of compared bits, the amplitude of the detection signal is reduced as compared to the prior art when the detected bit sequence does not match the reference code. For example, if all but one pair of compared bits match, the detection signal produced in the prior art would be N−1, whereas in the present invention, the detection signal will be only N−2 (i.e., add one for each of the N−1 matches and subtract one for the mismatch). Thus, as compared to the prior art, the response of the code matching filter 106 to a non-matching input is notably reduced. This reduction may be even more striking where certain Barker codes are used, as explained below.

In the embodiment under discussion, the code matching filter 106 is an analog device, and the value of the detection signal 120 is represented by its amplitude. In other embodiments, the code matching filter may be implemented in software or digital hardware, and the value of the detection signal 120 may be represented, for example, by a software variable, as a digital word, etc. The same is true for the code matching filter employed in other embodiments of the invention, including those described below with reference to FIGS. 4 and 5.

Referring again to FIG. 1, the detection signal 120 is provided to one input of the comparator 108 and a threshold reference is provided to another. When the detection signal 120 exceeds the threshold reference, the comparator provides a pulse at its output 122. In the particular embodiment under discussion (as well as other embodiments discussed below), this pulse is intended to indicate that the detected bit sequence present in the shift register 104 matches perfectly with the reference code provided to the code matching filter 106. Thus, the threshold reference is preferably set to a level just above N–2 so as to ensure non-matching detected bit sequences do not produce pulses at the comparator output 122 while completely matching detected bit sequences do. By lowering the threshold reference, as compared to the prior art, the likelihood of missed matches is generally reduced without increasing the likelihood of falsely detected matches (i.e., mismatches detected as matches).

The teachings of the present invention are not limited to any particular detection means. On the contrary, the registration mark 110 can be coded for an optical, infrared, ultraviolet, magnetic, mechanical or any other suitable type of detection system. Furthermore, a wide variety of techniques can be employed for encoding the registration mark on the object. For instance, an optical or ultraviolet brightener may be used to encode the positive bits of the binary code sequence on the object. An optical or ultraviolet sensor could then be used to sequentially read the positive bits of the sequence from the object, and to interpret the absence of a positive bit as a negative bit. In this manner, the registration mark 110 may comprise markings for the positive bits only, while still representing the entire binary code sequence. Alternatively, two different types of marks may be applied; one for positive bits and one for negative bits.

While the registration mark 110 has been described above as associated with a single object 112, it should be understood that the same registration mark may be applied to multiple objects, and/or to multiple portions of the same object, if desirable. Further, multiple registration marks, each representing a distinct binary code sequence, may be applied to a single object or series of objects. In such a case, multiple code matching filters may be employed (as can a single matching filter configured for comparing a sequence of sensor values to multiple reference codes), with each filter responding to a different one of the distinct registration marks.

In one preferred application of the invention, the object 112 is a component in a manufacturing process, such as a component in a process for manufacturing disposable absorbent articles (e.g., diapers, training pants, feminine care products, incontinence products, and the like). For instance, the object 112 may represent a graphical image or functional component of a child's training pant, where the component must be aligned with one or more other components during manufacture of the training pant. For this purpose, a registration mark representing a binary code sequence may be applied adjacent to or even within the graphical image to be registered, and then subsequently detected in the manner described above. It should be understood, however, that the teachings of the invention are not so limited, and may be applied to any application for detecting a registration mark associated with an object.

In one embodiment, the binary code sequence represented by the registration mark 110 is a Barker code. Barker codes (also referred to as "perfect codes") are used in radar for improved range detection accuracy, and allow operation at low radar transmitted power levels even in the presence of noise. Presently known Barker codes are shown in FIG. 3. The mathematical auto-correlation function (ACF) of a Barker code represents the results of applying a matched filter to the code, and will have a sharp peak of height N together with neighboring peaks, called sidelobes, having a height less than N. Ideally, these sidelobes will have a maximum height of one. The codes shown in FIG. 3 may also be used in reverse, with similar effect. Further, the codes of FIG. 3 may be combined into longer codes, referred to as "chained" Barker codes. For example, the five bit Barker code (+++−+) can be combined with the two bit Barker code (+−) to yield the following ten bit chained code: (+++−+) (−−−+−). Although the auto-correlation function for a chained Barker code is not ideal (i.e., the height of the sidelobes may exceed one), it does provide a sharp peak with generally low sidelobes.

To approximate the ideal Barker response for the system 100 illustrated in FIG. 1, the binary code sequence represented by the registration mark 110 is preferably a Barker code in which the number of positive bits differs from the number of negative bits by only one. Thus, the registration mark 110 preferably represents a seven or eleven bit Barker code so as to minimize any adverse affects introduced through use of a two state sensor output (e.g., +1 or −1) in contrast to the three states present in a radar return (i.e., no signal, zero degree phase angle, and 180 degree phase angle). As a result of using a seven or eleven bit Barker code in the system 100 of FIG. 1, the detection signal 120 will have a minimal response (i.e., an amplitude of one or less) for most if not all mismatches. The seven and eleven bit Barker codes may also be used in reverse, with similar effect.

The clock input 116 provided to the shift register 104 and the code matching filter 106 is preferably timed and synchronized with movement of the object 112 or the sensor 102 in such a manner that the shift register 104 is clocked once for each bit of the binary code sequence, but not at the same time that the output of the sensor changes state, which could otherwise yield one or more incorrect state values. In one specific application of the invention where an object bearing a registration mark to be detected is adhered to the surface of a rotating drum, the clock input may be generated, for example, by an encoder connected to a shaft of the rotating drum. The encoder clock may then be downsampled (i.e., divided) to an appropriate rate, if necessary.

Figure 4:
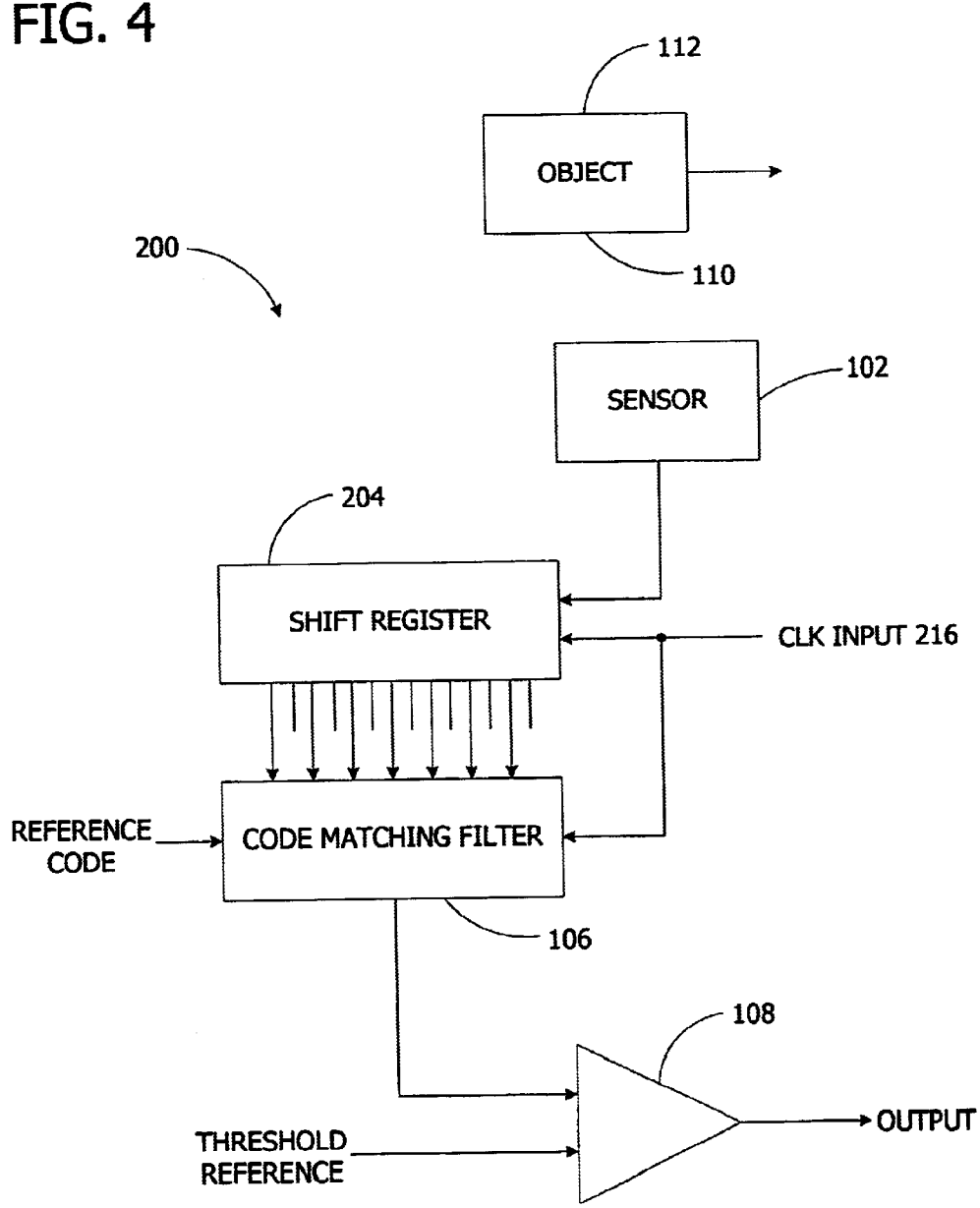
FIG. 4 is a block diagram of a system according to another preferred embodiment for avoiding potential edge timing issues.

As an alternative to synchronizing the clock signal as described immediately above, the system 200 shown in FIG. 4 may be used in lieu of the system 100 shown in FIG. 1. The system 200 is configured largely the same as the system 100, with two notable exceptions. First, a shift register 204 is provided which has twice as many stages as the shift register 104 shown in FIG. 1. As shown in FIG. 4, only every other stage (i.e., the even set of stages) of the shift register 204 are provided to the code matching filter 106. Second, a clock input 216 to the shift register 204 and the code matching filter 106 is preferably twice as fast as the clock input 116 employed in FIG. 1.

Due to the faster clock input 216, the output of the sensor 102 is sampled twice by the shift register 204 during each subpulse (i.e., bit) of the binary code sequence represented by the registration mark 110. Thus, as a sequence of bits are sequentially read by the sensor 102, two replicated versions of the detected bit sequence are passed through the shift register 204. One version of the detected bit sequence will be present in the odd stages of the shift register, and the other version of the detected bit sequence will be present in the even stages of the shift register. These two versions of the detected bit sequence should normally be identical, unless one version contains errors as a result of sampling the output of the sensor 102 during a state transition. Even in that event, however, the other version of the detected bit sequence should not suffer from edge transition errors, and should accurately represent the sequence of bits read by the sensor 102. By sequentially processing each version of the detected bit sequence in the code matching filter 106 during each subpulse (i.e., bit) of the binary code sequence, the system 200 ensures that any matching sequence of bits read by the sensor 102 will not be missed due to an edge timing issue.

While described in the context of detecting a registration mark associated with an object, it should be understood that this approach of the present invention to potential timing problems is applicable to any hardware implementation of a pattern matching function.

The systems of FIGS. 1 and 4, both of which utilize 2-state sensors, are further described in U.S. application Ser. No. 09/970,012 filed Oct. 3, 2001, the entire disclosure of which is incorporated herein by reference.

Figure 5:
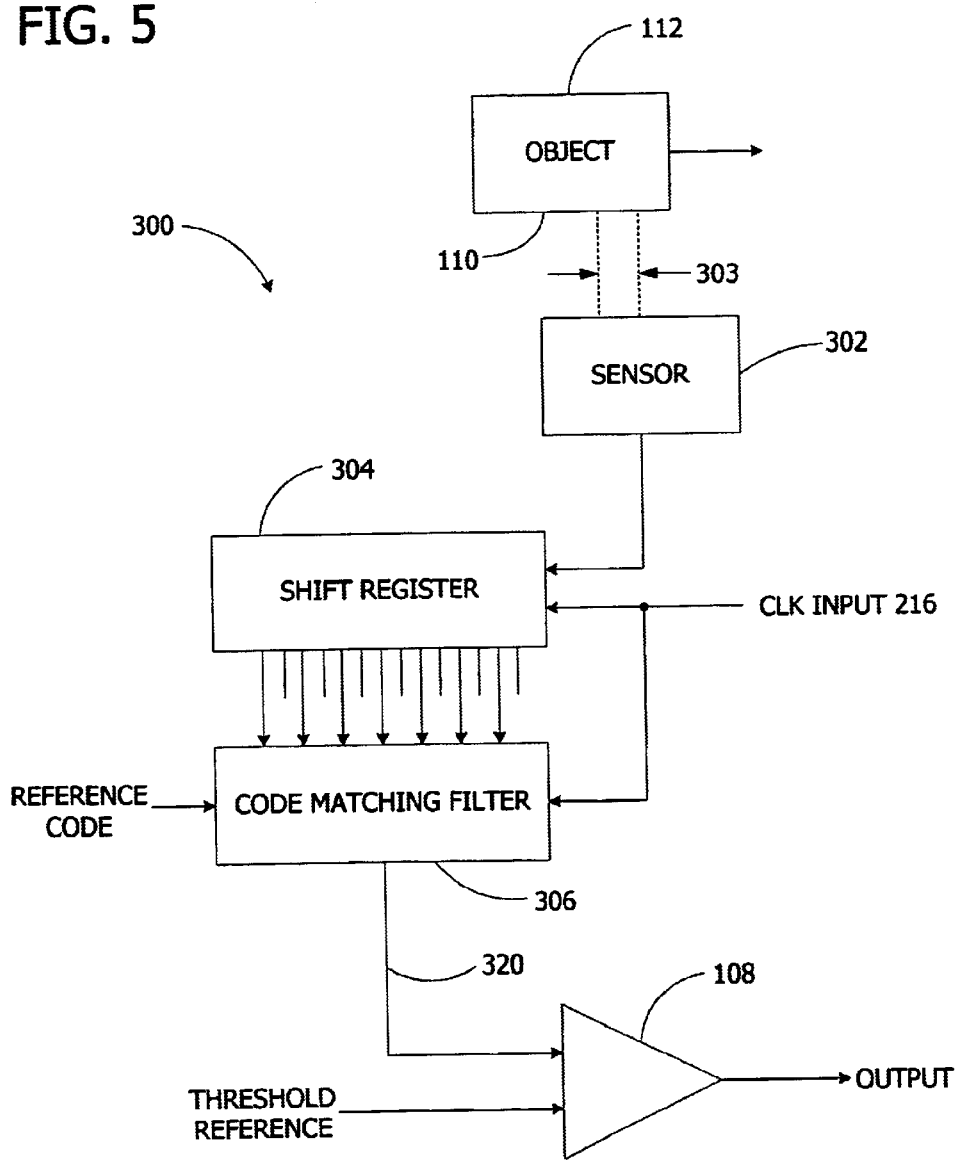
FIG. 5 is a block diagram of a system according to another preferred embodiment employing a 3-state sensor.

FIG. 5 illustrates a system 300 according to another embodiment of the present invention, which is capable of yielding the ideal Barker auto-correlation function response when the binary code sequence represented by the registration mark 110 is a Barker code. The system 300 is configured largely the same as the system 200 of FIG. 4, except that a 3-state sensor 302 is employed in conjunction with a shift register 304 and a code matching filter 306 configured for processing each of three discrete values output by the sensor 302 over time, as further explained below. (Though not required, the shift registers and code matching filter of previously described embodiments may be similarly capable of processing a 3-state sensor output.)

As noted above, the registration mark 110 is applied to or otherwise associated with the object 112, and represents a binary code sequence of N bits, where each bit has either a first discrete value or a second discrete value (e.g., 0 or 1, +1 or −1, etc.). For convenience, each such bit is referred to herein as either a "positive bit" or a "negative bit," it being understood that the positive and negative bits need not be represented by positive and negative values, respectively. Nevertheless, in certain preferred implementations of the invention, the positive bits are each represented by +1 and the negative bits are each represented by −1.

Referring again to FIG. 5, the value output by the sensor 302 takes a first state (e.g., +1) when a positive bit of the binary code sequence is detected by the sensor 302, a second state (e.g., −1) when a negative bit is detected, and a third state (e.g., 0) when neither a positive bit nor a negative bit is detected (e.g., when no bit is within the field of detection 303 of the sensor 302). This 3-state sensor output is provided to an input of the shift register 304, as shown in FIG. 5. As in other embodiments of the invention, the shift register 304 samples the output of the sensor 302 over time in response to the clock input 216 so as to produce a sequence of sensor values within the shift register 304.

Similar to the system 200 of FIG. 4, the shift register 304 preferably has twice as many stages as the number N of bits employed in the binary code sequence, with only every other stage (i.e., the even set of stages for the system of FIG. 5) connected to the code matching filter 306. And as described above with reference to the system 200 of FIG. 4, the clock input 216 preferably samples the output of the shift register twice during each subpulse (i.e., bit) of the binary code sequence represented by the registration mark. As a result, two replicated versions of the detected sequence of values are processed by the code matching filter 306 (which is also controlled by the clock input 216) during each subpulse of the binary code sequence, with at least one of the replicated versions being immune from edge timing issues. If a slower clock input is used, it is preferably synchronized with movement of the object 112 or the sensor 302 in such a manner that the shift register 304 is not clocked at the same time that the output of the sensor 302 changes state, which could otherwise yield one or more incorrect state values.

During each cycle of the clock input 216, the code matching filter 306 compares each sensor value received from the shift register 304 with a corresponding bit of a reference code (i.e., the binary code sequence) and generates a detection signal 320 for input to the comparator 108. Similar to other embodiments of the invention described above, the code matching filter 306 preferably increments the detection signal 320 for each sensor value which matches a corresponding bit of the binary code sequence, and decrements the detection signal 320 for each sensor value which is complementary to a corresponding bit of the binary code sequence (e.g., a sensor value of +1 is complementary to a negative bit of the binary code sequence, and a sensor value of −1 is complementary to a positive bit). Significantly, however, the code matching filter 306 neither increases nor decreases the value of the detection signal 320 in response to a sensor value taking the zero state (which, again, indicates that neither a positive bit nor a negative bit of the binary code sequence was detected by the sensor 302 at a particular time). By adjusting the detection signal 320 only in response to detection of a positive or negative bit (i.e., only when the registration mark is present), the code matching filter 306 provides the ideal Barker response when the binary code sequence is a Barker code. This means that the detection signal 320 is provided with a maximum value of N when a sequence of sensor values received in parallel from the shift register 304 matches perfectly with the Barker code represented by the registration mark, while providing only a minimal response (i.e., a value of one or less) for all mismatches. Thus, the threshold reference to the comparator 108 may be set to any level greater than one and less than N to ensure detection of each matching sequence of sensor values.

Figure 6:
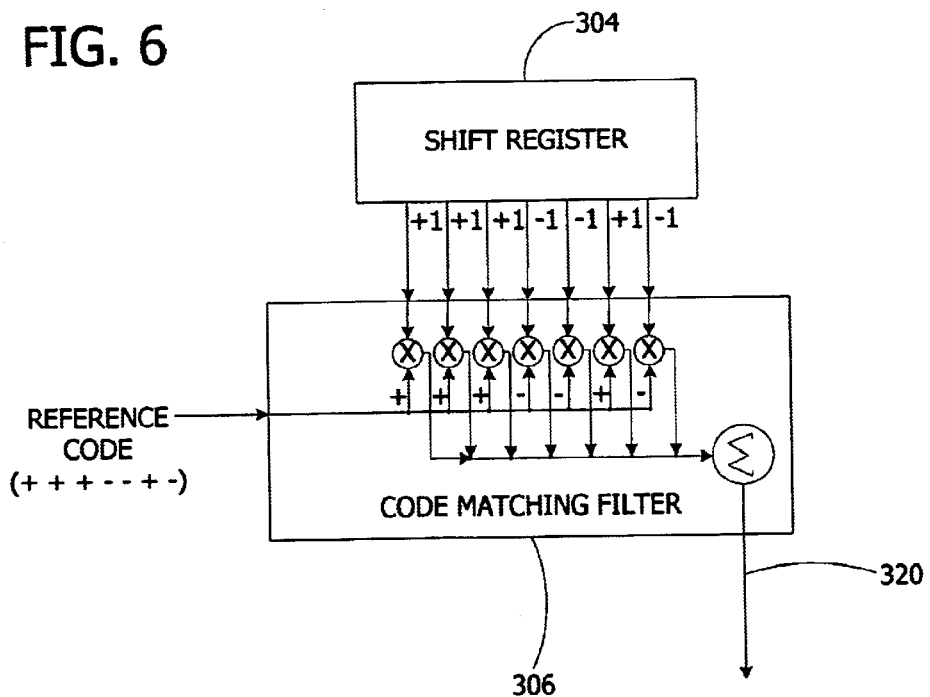
FIG. 6 is a block diagram illustrating one preferred implementation of the code matching filter shown in FIG. 5.

As shown in FIG. 6, the code matching filter 306 preferably multiplies each sensor value received from the shift register 304 with a corresponding bit of the reference code, and then sums the results of these multiplications to produce the detection signal 320. Thus, if a sensor value matches its corresponding bit of the reference code (e.g., because the sensor value and its corresponding bit both have a value of either +1 or −1), the result (i.e., product) of that multiplication will be a +1 value, which is then provided to a summer so as to increment the value of the detection signal 320. Conversely, if a sensor value is complementary to its corresponding bit of the reference code (e.g., because the sensor value and its corresponding bit have values of +1 and −1, respectively, or vice versa), the result of that multiplication will be a −1 value, which is then provided to the summer so as to decrement the value of the detection signal 320. However, a sensor value of zero will always yield a product of zero, regardless of the value of its corresponding bit of the reference code, and will therefore neither increment nor decrement the value of the detection signal 320.

The code matching filter implementation described above with reference to FIG. 6 is especially suited to a digital hardware implementation. In the case where the code matching filter 306 is implemented in software, it may also be configured to output a detection signal with a value of, e.g., one (or zero) for any clock cycle in which the sequence of sensor values received from the shift register 304 contains one or more zero values (or any other value defined to indicate non-detection of a positive or negative bit).

Figure 7A:
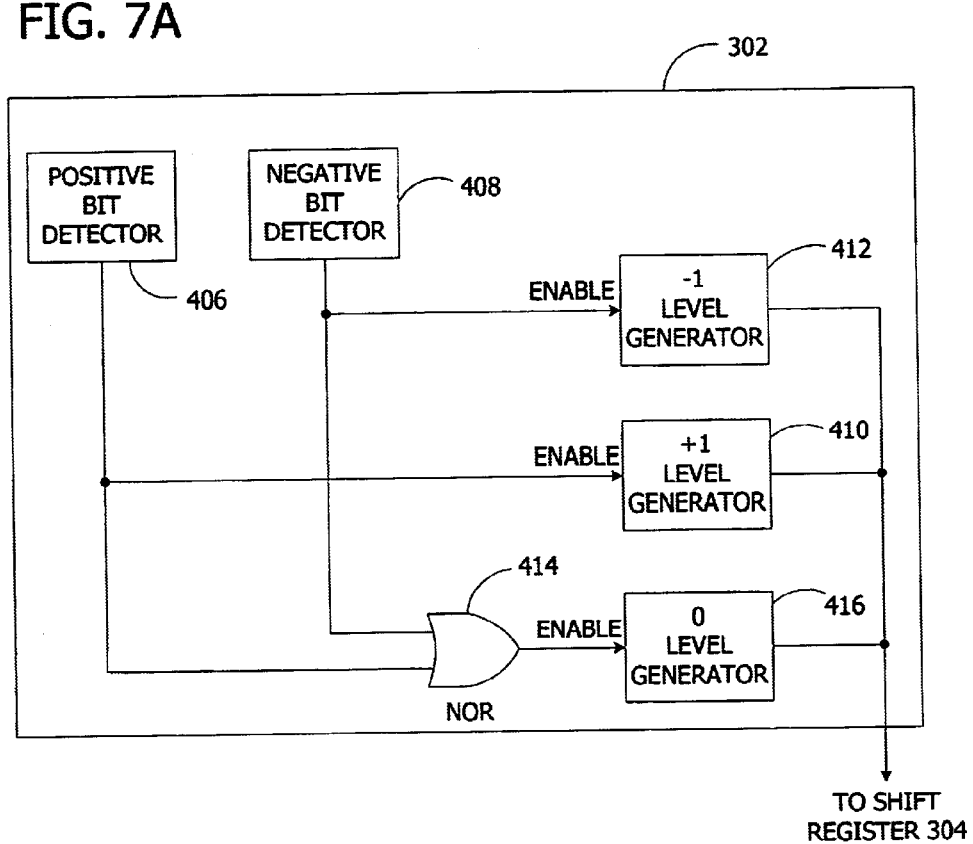
FIG. 7(a) is a block diagram illustrating one preferred implementation of the sensor shown in FIG. 5.
Figure 7B:
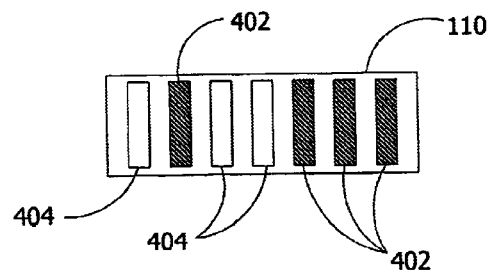
FIG. 7(b) illustrates a registration mark especially suited for detection by the sensor implementation of FIG. 7(a).

FIG. 7(a) illustrates one preferred implementation of the sensor 302 for detecting a registration mark 110 of the form shown in FIG. 7(b), which uses a first type of mark 402 having a first response for each positive bit of the registration mark 110, and a second type of mark 404 having a second response for each negative bit of the registration mark. By way of example, and not limitation, the first type of mark 402 may be an optical brightener having a first wavelength response, and the second type of mark 404 may be an optical brightener having a second wavelength response that is different than the first wavelength response. Due to the spaces between the marks 402, 404 shown in FIG. 7(b), the output of the sensor 302 is preferably sampled at times when the marks 402, 404 (and not the spaces) are in the detection field 303 (FIG. 5) of the sensor 302, as apparent to those skilled in the art. Alternatively, the spaces shown in FIG. 7(b) can be removed.

As shown in FIG. 7(a), the sensor 302 employs a positive bit detector 406 and a negative bit detector 408. The positive bit detector 406 and the negative bit detector 408 are connected to the enable inputs of a +1 level generator 410 and a -1 level generator 412, respectively, as well as to inputs of a NOR gate 414. When a positive bit of the registration mark 110 enters the detection range of the sensor 302, the positive bit detector 406 triggers the +1 level generator 410 to produce a sensor output having a +1 value. When a negative bit of the registration mark 110 enters the detection range of the sensor 302, the negative bit detector 408 triggers the -1 level generator 412 to produce a sensor output having a -1 value. If the positive bit detector 406 fails to detect a positive bit of the registration mark at the same time that the negative bit detector 408 fails to detect a negative bit of the registration mark, such that both detectors 406, 408 output a value of zero, the NOR gate 414 will trigger a zero level generator 416 so as to produce a sensor output having a zero value. Although not shown in FIG. 7(a), logic may also be provided to eliminate contention in an error or detector misalignment situation where, e.g., a positive bit and a negative bit of the binary code sequence are simultaneously detected.

While two separate detectors 406, 408 are shown in FIG. 7(a), other suitable arrangements may be employed, including a single detector capable of detecting both positive and negative bits (i.e., capable of detecting both the first type of mark 402 and the second type of mark 404).

Figure 8A:
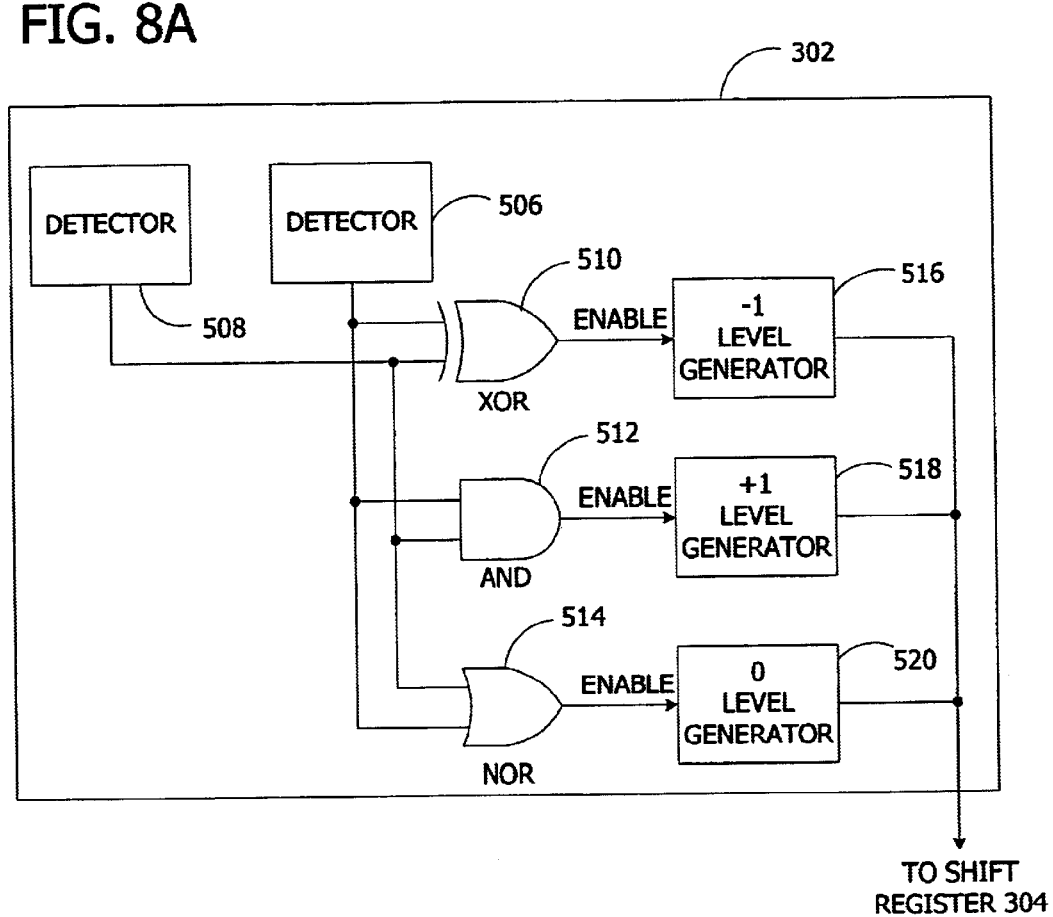
FIG. 8(a) is a block diagram illustrating another preferred implementation of the sensor shown in FIG. 5.
Figure 8B:
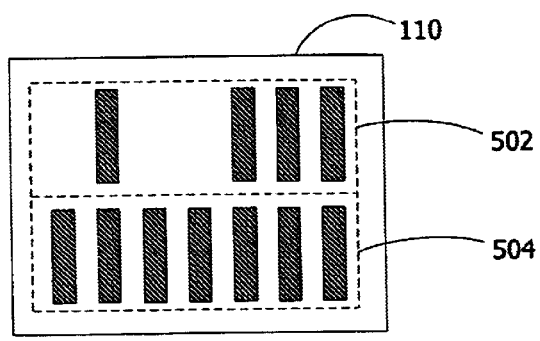
FIG. 8(b) illustrates a registration mark especially suited for detection by the sensor implementation of FIG. 8(a).

FIG. 8(a) illustrates one alternative implementation of the sensor 302 for detecting a registration mark 110 of the form shown in FIG. 8(b). In this implementation, the registration mark 110 includes two portions: an encoded mark 502 which represents the binary code sequence, and an enabling mark 504 for confirming a presence of the registration mark 110, as further explained below. The encoded mark 502 and the enabling mark 504 are preferably located adjacent to one another (e.g., along parallel tracks), as shown in FIG. 8(b).

The enabling mark 504 preferably includes N adjacent markings (or, e.g., a single mark extending along the length of the encoded mark 502) aligned with individual bit locations in the encoded mark 502. Similar markings are used in the encoded mark 502 to note the location of positive bits of the binary code sequence. Thus, the presence of a marking in the encoded mark 502 represents a positive bit of the binary code sequence. Conversely, the absence of a marking in the encoded mark 502 represents a negative bit of the binary code sequence, but only when the enabling mark 504 is present to thereby confirm that the absence of a positive bit marking in the encoded mark 502 should, in fact, be interpreted as a negative bit of the binary code sequence.

Referring again to FIG. 8(a), the sensor 302 in this embodiment includes a first detector 506 for sensing the encoded mark 502, and another detector 508 for sensing the enabling mark 504. Both detectors 506, 508 are connected to inputs of an XOR gate 510, an AND gate 512, and a NOR gate 514. If the detector 506 does not detect a positive bit in the encoded mark 502, but the detector 508 detects the enabling mark 504, the XOR gate 510 triggers a -1 level generator 516 to produce a sensor output having a -1 value. If the detector 506 detects a positive bit in the encoded mark 502 while the detector 508 detects the enabling mark 504, the AND gate 512 triggers a +1 level generator 518 to produce a sensor output having a +1 value. If the detector 506 does not detect a positive bit in the encoded mark 502, and the detector 508 does not detect the enabling mark 504, the NOR gate 514 triggers a 0 level generator to produce a sensor output having a 0 value. Thus, according to this specific implementation of the invention, the registration mark 110 can be advantageously formed using a single type of optical brightener (or other detectable substance or device), while still allowing the sensor 302 to produce a three-state output which distinguishes between positive bits of the binary code sequence, negative bits of the binary code sequence, and an absence of the registration mark 110 altogether.

While two separate detectors 506, 508 are shown in FIG. 8(a), the sensor 302 may alternatively employ a single detector capable of detecting both the encoded mark 502 and the enabling mark 504, as apparent to those skilled in the art. Further, while exemplary registration marks 110 and sensors 302 have been described above with reference to FIGS. 7 and 8, those skilled in the art will recognize that a wide variety of registration marks and sensor designs may be employed without departing from the scope of the invention. As just one additional example, a binary code sequence (which may or may not be a Barker code) may itself be comprised of multiple Barker codes where, e.g., positive bits of the binary code sequence are represented by one Barker code, and negative bits are represented by another Barker code (which may or may not have the same number of bits as the Barker code representing the positive bits).

When introducing elements of the present invention and the preferred embodiments, the articles "a," "an," "the" and "said" are intended to mean that there are one or more such elements. The terms "comprising," "including" and "having" are intended to be inclusive and mean there may be additional elements other than those listed.

As various changes could be made in the above constructions without departing from the scope of the invention, it is intended that all matter contained in the above description or shown in the accompanying drawings shall be interpreted as illustrative and not in a limiting sense.

What is claimed:

1. A method of sensing a registration mark associated with an object, the registration mark representing a binary code sequence of N bits with each bit having either a first discrete value or a second discrete value, where N is an integer greater than one, the method comprising:

sensing within a field of detection each of the bits of the registration mark; and generating a sensor value in response to the sensing of each bit, the sensor value taking a first state when the sensed bit has the first discrete value, the sensor value taking a second state when the sensed bit has the second discrete value, and the sensor value taking a third state when no bit having the first discrete value or the second discrete value is detected in the field of detection.

2. The method of claim 1 wherein generating includes generating a plurality of sensor values over time, and wherein each sensor value takes the first state, the second state, or the third state as a function of whether the sensed bit has the first discrete value, as a function of whether the sensed bit has the second discrete value, or as a function of whether no bit having the first discrete value or the second discrete value is detected when such sensor value is generated.

3. The method of claim 2 wherein sensing comprises sequentially sensing within the field of detection each of the bits of the registration mark and further comprising comparing N sequential sensor values with corresponding sensed bits of the binary code sequence.

4. The method of claim 3 further comprising generating a detection signal in response to the comparing, including increasing a value of the detection signal for each sensor value which matches its corresponding bit of the binary code sequence, decreasing the value of the detection signal for each sensor value which is complementary to its corresponding bit of the binary code sequence, and neither increasing nor decreasing the value of the detection signal for each sensor value taking the third state, the detection signal indicating detection of the registration mark when the detection signal exceeds a predefined value.

5. The method of claim 4 wherein the binary code sequence is a Barker code, and wherein the predefined value is one.

6. The method of claim 1 wherein the first discrete value is +1 and the second discrete value is −1, wherein the first state is +1, the second state is −1, and the third state is 0, and wherein generating the detection signal includes multiplying the N sequential sensor values with corresponding bits in the binary code sequence and summing results of the multiplying.

7. The method of claim 1 wherein the object is a component of a disposable absorbent article.

8. The method of claim 1 wherein the registration mark includes a first type of mark for bits having the first discrete value and a second type of mark for bits having the second discrete value, wherein sensing includes sensing for both the first type of mark and the second type of mark, and wherein generating includes generating a sensor value taking the third state when neither the first type of mark nor the second type of mark is detected.

9. The method of claim 8 wherein the first type of mark has a first wavelength response and the second type of mark has a second wavelength response different than the first wavelength response.

10. The method of claim 1 wherein the registration mark includes an encoded mark representing the binary code sequence, and an enabling mark for confirming a presence of the registration mark, wherein sensing includes sensing for both the encoded mark and the enabling mark, and wherein sensing further includes interpreting an absence in the encoded mark of a bit having the first discrete value as a bit having the second discrete value if the enabling mark is detected.

11. The method of claim 10 wherein generating includes generating a sensor value taking the third state when the enabling mark is not detected.

12. A system for detecting a registration mark associated with an object, the registration mark representing a binary code sequence of N bits with each bit having either a first discrete value or a second discrete value, where N is an integer greater than one, the system comprising:

a sensor for sequentially sensing within a field of detection each of the bits of the registration mark, the sensor having an output, the sensor output taking a first state when the sensed bit has the first discrete value, the sensor output taking a second state when the sensed bit has the second discrete value, and the sensor output taking a third state when no bit having the first discrete value or the second discrete value is detected within the field of detection;

a shift register for sampling the sensor output over time to produce a sequence of sensor values, each sensor value taking one of the first state, the second state, or the third state; and a matching filter operatively connected to the shift register for comparing N of the sensor values with corresponding bits of the binary code sequence, and for generating a detection signal in response to the comparing; and wherein the matching filter is configured to increase a value of the detection signal for each sensor value which matches its corresponding bit of the binary code sequence, decrease the value of the detection signal for each sensor value which is complementary to its corresponding bit of the binary code sequence, and neither increase nor decrease the value of the detection signal for each sensor value taking the third state, the detection signal indicating detection of the registration mark when the detection signal exceeds a predefined value.

13. The system of claim 12 wherein the binary code sequence is a Barker code, and wherein the predefined value is one.

14. The system of claim 12 wherein the shift register has at least 2N stages, and wherein every other one of the stages is operatively connected to the code matching filter.

15. The system of claim 14 wherein the binary code sequence comprises a plurality of subpulses, and wherein the shift register is configured to sample the sensor output at least twice during each subpulse of the binary code sequence.

16. The system of claim 12 wherein the registration mark includes a first type of mark having a first response for bits having the first discrete value, and a second type of mark having a second response for bits having the second discrete value.

17. The system of claim 16 wherein the sensor comprises a first detector for sensing the first type of mark, a second detector for sensing the second type of mark, and logic for producing the sensor output in response to sensing by the first detector and the second detector.

18. The system of claim 12 wherein the registration mark includes an encoded mark representing the binary code sequence, and an enabling mark for confirming a presence of the registration mark.

19. The system of claim 18 wherein the sensor comprises at least one detector for sensing the encoded mark and the enabling mark.

20. The system of claim 19 wherein the sensor comprises a first detector for sensing the encoded mark, a second detector for sensing the enabling mark, and logic for producing the sensor output in response to sensing by the first detector and the second detector.

* * * * *